(12) United States Patent
Carlow et al.

(10) Patent No.: US 6,334,982 B1
(45) Date of Patent: Jan. 1, 2002

(54) CORONA DISCHARGE REACTOR

(75) Inventors: John Sydney Carlow, Southampton; Norman Jorgensen, Reading; Robert Francis King, Abingdon; Roy McAdams, Didcot; Fiona Winterbottom, Reading, all of (GB)

(73) Assignee: Accentus PLC, Didcot (GB)

( * ) Notice: Subject to any disclaimer, the term of this patent is extended or adjusted under 35 U.S.C. 154(b) by 0 days.

(21) Appl. No.: 09/508,603

(22) PCT Filed: Sep. 15, 1998

(86) PCT No.: PCT/GB98/02799

§ 371 Date: Mar. 14, 2000

§ 102(e) Date: Mar. 14, 2000

(87) PCT Pub. No.: WO99/15267

PCT Pub. Date: Apr. 1, 1999

(30) Foreign Application Priority Data

Sep. 19, 1997 (GB) ................................................ 19858

(51) Int. Cl.$^7$ ................................................ B01J 19/08
(52) U.S. Cl. ................................................ 422/186.04
(58) Field of Search ..................................... 422/186.04

(56) References Cited

U.S. PATENT DOCUMENTS 5,236,672 A  *  8/1993  Nunez et al.  .......... 422/186.04
5,655,210 A  *  8/1997  Gregoire et al. ....... 422/186.04

* cited by examiner

*Primary Examiner*—Kishor Mayekar
(74) *Attorney, Agent, or Firm*—William H. Holt

(57) ABSTRACT

A corona discharge reactor is for use in processing materials in or carried by a gaseous phase. A plurality of cylindrical individual reactor chambers is provided in an array. The reactor chambers are electrically matched with each other and pulses of electrical energy are supplied under sequential control to each of the individual reactor chambers.

14 Claims, 4 Drawing Sheets

CORONA DISCHARGE REACTOR

BACKGROUND OF THE INVENTION

Field of the Invention

The present invention relates to reactors for the processing of materials in or carried by a gaseous phase by means of corona discharges.

Considerable effort is being expended on the development of techniques for carrying out processes in the gaseous phase, using species which have been activated by corona discharges. Corona discharges occur in gaseous media when the localised electric field in the neighbourhood of a body exceeds the electrical breakdown voltage of the gaseous medium.

Description of the Related Art

Existing corona discharge reactors consist of a chamber having an inlet and an outlet for a gaseous medium, an axial inner electrode and a cylindrical outer electrode surrounding the inner electrode. The electrical discharge within such reactors consists of streamers extending from the inner electrode towards the outer electrode. For the effective processing of a gaseous medium passing through the reactor, it is necessary to produce as many corona streamers as possible because any space which does not contain such streamers is dead space as far as the processing of the gaseous medium is concerned.

In one type of known corona discharge reactor the central electrode is in the form of a wire However, the rapid fall-off in the electric field in a central wire electrode type of corona discharge reactor means that the corona discharge streamers propagate only a short distance from the central wire. This phenomenon limits the efficiency with which gaseous medium passing through the reactor can be treated.

Existing central wire electrode corona discharge reactors have diameters of a few centimeters and lengths of a few tens of centimeters. As a result, to process reasonable volumes of gas, high flow rates are required, which in turn tend to increase the mechanical instability of the central electrode due to aerodynamic effects as well as leading to short residence times in the reactor chamber of the medium to be processed. Hence, existing corona discharge reactors are limited inherently in their effectiveness.

Other corona discharge reactors, see for example, our earlier patent GB 2 282 738, U.S. Pat. Nos. 5,041,145, 5,268,151 or 4,966,666, make use of central electrodes which have a larger diameter. Among other things this reduces the electric field gradient in the region of the central electrode, but there still remains a limitation on the separation between the inner and outer electrodes if an effective corona discharge is to be maintained. Merely increasing the length of corona discharge reactors does not provide an answer to the problem because the gas flow resistance becomes excessive. Also, corona discharge reactors operate in a pulsed manner, and the time taken for an energising pulse to traverse the length of the central electrode, provides another factor which limits the length of a corona discharge reactor.

GB specification 2,008,369A discloses an ozone generator which includes a plurality of parallel electric discharge chambers each of which has a central wire electrode. The wires are supported at their ends by two grid structures to one of which a common feed wire is connected to which, in use a d.c. voltage is applied.

As the device is operated in a d.c. mode, no a.c. current distribution effects have to be considered.

GB patent 1,589,394 discloses an ozone generator which includes a number of parallel corona discharge chambers. A single power supply, which may produce pulsed d.c., a.c., or a mixture of both, potentials is used, but no attempt is made to equalise the distribution of the power supplied to the discharge chambers, either in terms of magnitude or time.

U.S. Pat. No. 4,495,043 discloses an ozoniser in which there is a plurality of ozone producing chambers which are connected to a single pulsed a.c. power supply. However, the ozone producing chambers are not operated simultaneously or, continuously, but are operated sequentially in a pulsed a.c. mode, the duration of each pulse being related to the passage time of a pulse of ozone-producing gas through the corresponding ozone producing chamber, and the intervals between the pulses applied to a given ozone-producing chamber being such that ozone produced by one power pulse is cleared from the chamber before the next power pulse is applied to that ozone-producing chamber.

The patent is concerned mainly with the design of the power supply. The question of the electrical relationship between the ozone-producing chambers is not addressed at all.

U.S. Pat. No. 5,009,858 discloses an ozoniser in which ozone is produced by a silent electric discharge in a number of chambers operated in parallel from a common power supply. The electrical relationship between one ozone producing chamber and another is not discussed at all, but it would appear that the ozone producing. chambers are operated in a continuous a.c. mode.

BRIEF SUMMARY OF THE INVENTION

It is an object of the present invention to provide an improved form of corona discharge reactor for use in the processing of gaseous media by means of electrically activated species.

The term gaseous medium includes the case when one or more constituents of the medium is in the form of an aerosol, or finely divided solid matter carried by a gaseous phase.

According to the present invention there is provided a corona discharge reactor for use in the processing of gaseous media by means of an electrical discharge, including a plurality of individual cylindrical reactor chambers each of which has a central electrode having radial projections thereon, and a concentric outer electrode, a conduit for admitting a gaseous medium to the reactor chambers to be processed in parallel thereby, an outlet for processed gaseous medium from the reactor chambers, and an electrical power supply having power supply lines for applying when switched on a sequence of pulses of electrical energy across the electrodes of the reactor chambers, wherein the electrical impedances of the reactor chamber and the associated power supply lines are matched to one another so that the pulses of electrical energy are applied equally to the individual reactor chambers at predetermined intervals.

Preferably the arrangement is such that the pulse of electrical energy is applied simultaneously to each of the individual reactor chambers.

The central electrode may be solid or hollow so that a cooling medium can be circulated through it. As in the corona discharge reactor described in our earlier patent GB 2 282 273 B the central electrodes can consist of a rod or tube with the radial projections machined upon its surface as a screw thread, or parallel fins, with or without an insulating material filling the spaces between the fins, or they can be made up of a stack of metal disks assembled upon a central conductor either with disks of an insulating material between them, or simply spaced apart with a gas gap between adjacent disks.

The outer electrode can be machined from a solid billet of metal, but preferably it is fabricated as a stack of metal plates which may be separated by other plates of insulating material, or, again, simply held apart, for example by spacers, which may also be of metal. Electrical connection between the metal plates, where these are separated from one another by insulating plates, is made by a number of rods which also serve to locate the components of the outer electrode assembly and clamp them together. This form of construction has the advantage that the edges of the holes in the metal plates can be tapered to form a sharp edge which facilitates the generation of the corona discharge in each of the reactor chambers. Alternatively, the holes in the insulating plates or metal spacers can have a diameter larger than those in the metal plates, so as to provide two sharp edges per plate instead of one.

Preferably the insulating material, where used in the construction of both electrodes, is a temperature resistant material such as a ceramic material.

If it is desired to use corona discharges of the so-called silent type, the passages in the outer electrode can have a cylinder of an insulating, preferably heat-resistant, material inserted in them.

In a preferred arrangement there are six passages through the outer electrode disposed at the apices of a regular hexagon. The advantage of this arrangement is that a single power input can be fed to the centre of the hexagon and thence to the individual reactor chambers via six identical conductors, thus easily satisfying the preferred criterion of applying a pulse of energy to each of the reactor chambers simultaneously. Other numbers of passages, and hence reactor chambers, can be used; the preferred criterion is that the central electrodes of the reactor chambers should be disposed around the circumference of a circle. In such arrangements, fed by a single power supply, it is important that the individual reactor chambers have matching electrical characteristics.

Other arrangements of reactor chambers, for example a square array, can be used, but it is then more difficult to match each reactor chamber to the power supply to ensure that equal pulses of energy are applied simultaneously to each of the reactor chambers.

BRIEF DESCRIPTION OF THE SEVERAL VIEWS OF THE DRAWINGS

The invention will now be described by way of example, with reference to the accompanying drawings in which.

DETAILED DESCRIPTION OF EMBODIMENTS OF THE INVENTION

Figure 1:
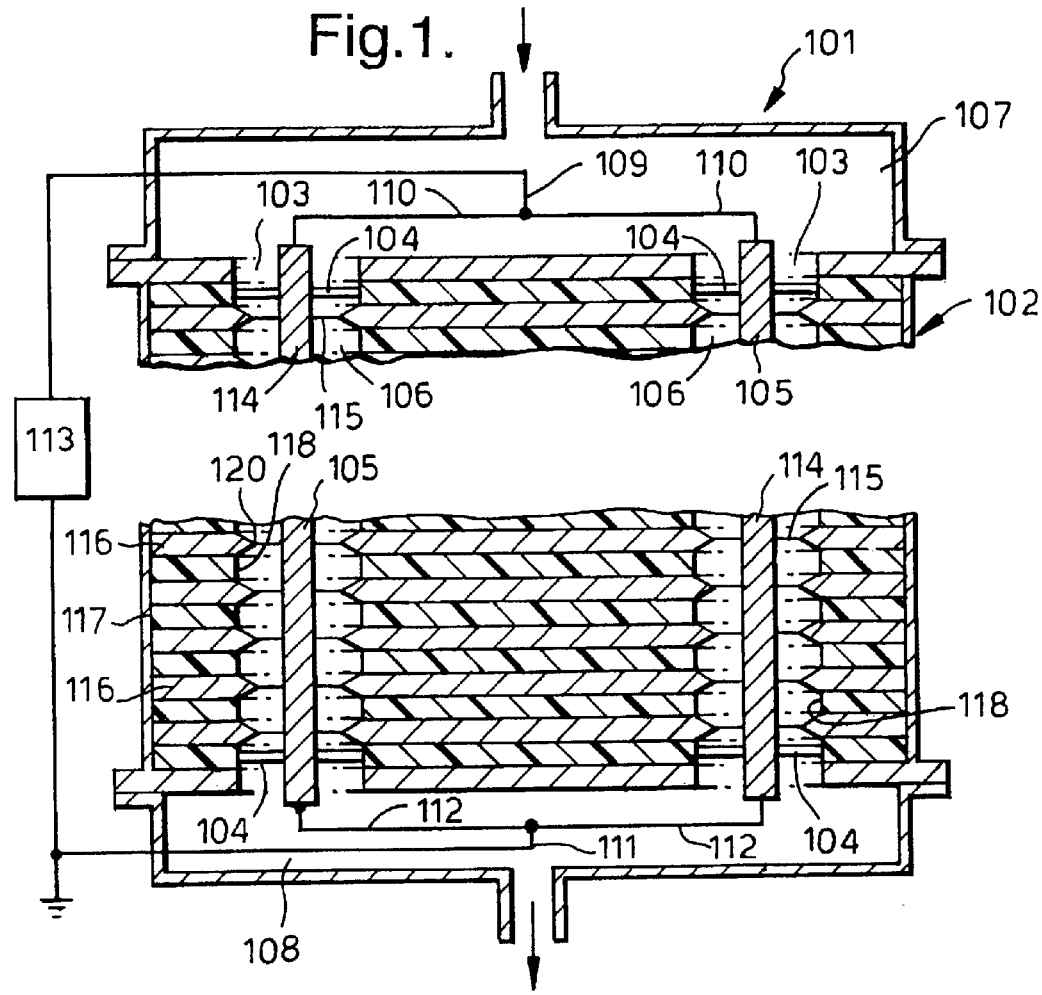
FIG. 1 is a diagrammatic longitudinal section of an embodiment of the invention.
Figure 2:
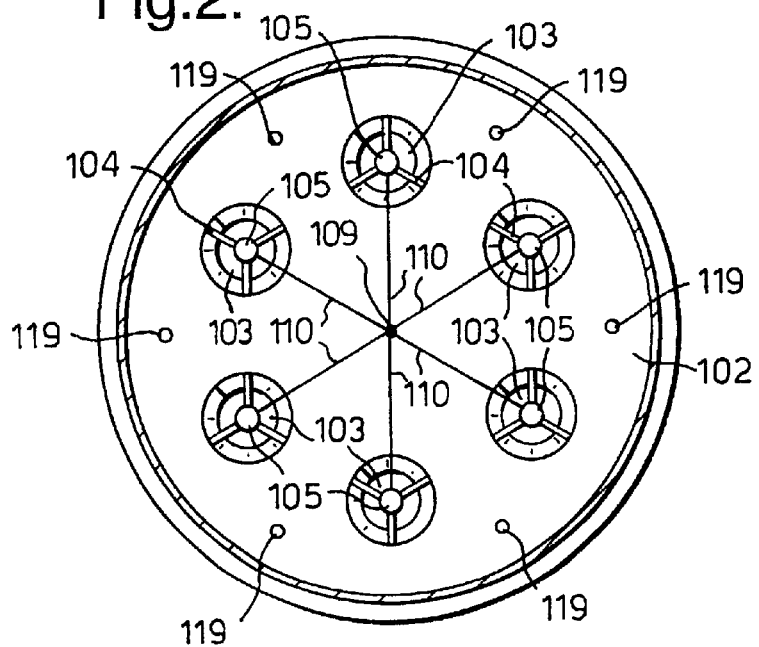
FIG. 2 is a plan view of the embodiment of the invention shown in FIG. 1.

Referring to FIGS. 1 and 2, a corona discharge reactor apparatus 101 consists of an outer electrode assembly 102 in which there are six parallel longitudinal gas passages 103. The gas passages 103 are cylindrical in section and have the same diameter. Located axially in each of the passages 103 by means of upper and lower spiders 104 is a central electrode 105. The combination of the passages 103 in the outer electrode assembly 102 and the central electrodes 105 constitutes six separate reactor chambers 106.

At the top and bottom of the outer electrode assembly 102 are inlet and outlet plenum chambers 107 and 108, respectively, so that a gaseous medium to be processed by means of corona discharges in the apparatus 101 flows through each of the reactor chambers 106 in parallel. The separate reactor chambers 106 are disposed with their centres at the apices of a regular hexagon and the power input ends of the central electrodes 105 are connected to a central input terminal 109 via identical connectors 110. Similarly, the output ends of the central electrodes 105 are connected to a central earthing terminal 111 via connectors 112. The outer electrode assembly also is earthed. A pulsed power supply 113 is connected to the central input terminal 109 of the corona discharge reactor apparatus 101.

As in the corona discharge reactor which forms the subject of our patent GB 2 282 738, the central electrodes 105 of the separate corona discharge reactors 106 consist of a central rod 114 with a series of radial projections 115. Any of the types of central electrode disclosed in GB 2 282 738 can be employed in the present invention, but a form in which the radial projections are parallel fins is preferred.

The outer electrode assembly consists of a stack of plates 116 made of a high temperature and corrosion resistant metal, separated by ceramic insulating plates 117. Each of the metal and ceramic plates 116 and 117, respectively, has appropriate holes 118 in it so that when assembled, the parallel gas passages 106 are formed. Electrical connection between the metal plates 116 is made by means of tie rods 119 by means of which the plates 116 and 117 are clamped together to form the outer electrode assembly 102. The thickness of the ceramic plates 117 is such that the metal plates 116 are positioned opposite the radial projections 115 on the central electrodes 105. If desired, to increase the efficiency of the generation of corona discharge streamers, the edges of the holes 118 in the metal plates 115 can be tapered, as shown in FIG. 1, to form a sharp edge as at 120. Alternatively, the holes 118 in the ceramic plates 116 can be made to be slightly larger in diameter than those in the metal plates 115 so that the two edges of the holes 118 in the metal plates 115 are exposed.

The choice of configuration is dependent upon the way in which the reactor is designed to operate. Thus, if the corona discharge is to be a "positive" discharge, that is initiated from the positive electrode, then we have found exposed sharp edges perform more satisfactorily. If, on the other hand, the corona discharge is to be of a "negative" discharge, that is initiated from the negative electrode, we have found this occurs more efficiently from an electrode configuration in which the edges of the metal discs are flush with intervening insulating discs.

Figure 3:
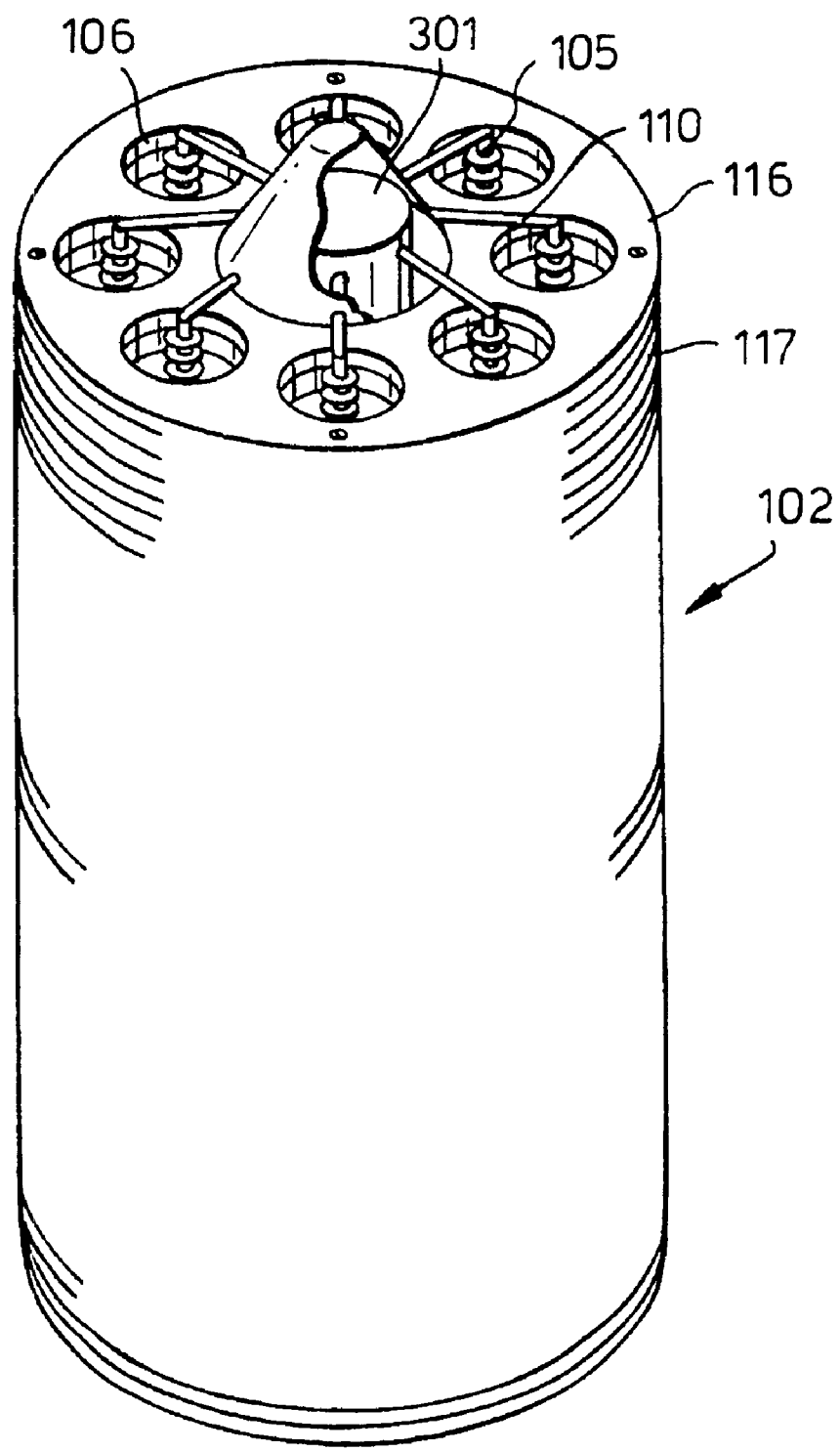
FIG. 3 is a schematic projection of the electrode structure of a second version of the embodiment of the invention shown in FIG. 1.

In order to ensure that corona discharges rather than arcs are formed in the reactor chambers 106 it is necessary to ensure that the power pulses supplied by the power supply 113 have a fast rise time, preferably of the order of nanoseconds. Also, it is important to avoid spurious discharge effects, so that corona discharges should be excited in each of the separate reactor chambers 106 under sequential control. It is preferable for the discharge to be excited simultaneously. To achieve the latter it is necessary to match the impedances of each of the reactor chambers 106 and to ensure that the input power pulses are applied simultaneously to each of the central electrodes 105 of the reactor chambers 106. The hexagonal array of reactor chambers 106 facilitates this because each of the connectors 110 has the same impedance. In general, any number of reactor chambers 106 can be used with a single power input point providing their centres are distributed around the circumference of a circle. For example, FIG. 3 shows schematically the electrode arrangement of another embodiment of the invention in which eight reactor chambers 106 are disposed regularly in a circle about a central power input point 301. The remainder of the apparatus is as described with reference to FIGS. 1 and 2.

In practice, suitable pulse rise times are about ten nanoseconds, and the pulse length is chosen to be short enough, usually some tens of nanoseconds, to avoid the occurrence of electrical breakdown between the electrodes. Suitable peak voltages are of the order of tens of kilovolts, although peak voltages of over 100 kV have been used. Pulse repetition rates of between 100 and 3,000 per second are suitable.

Figure 4:
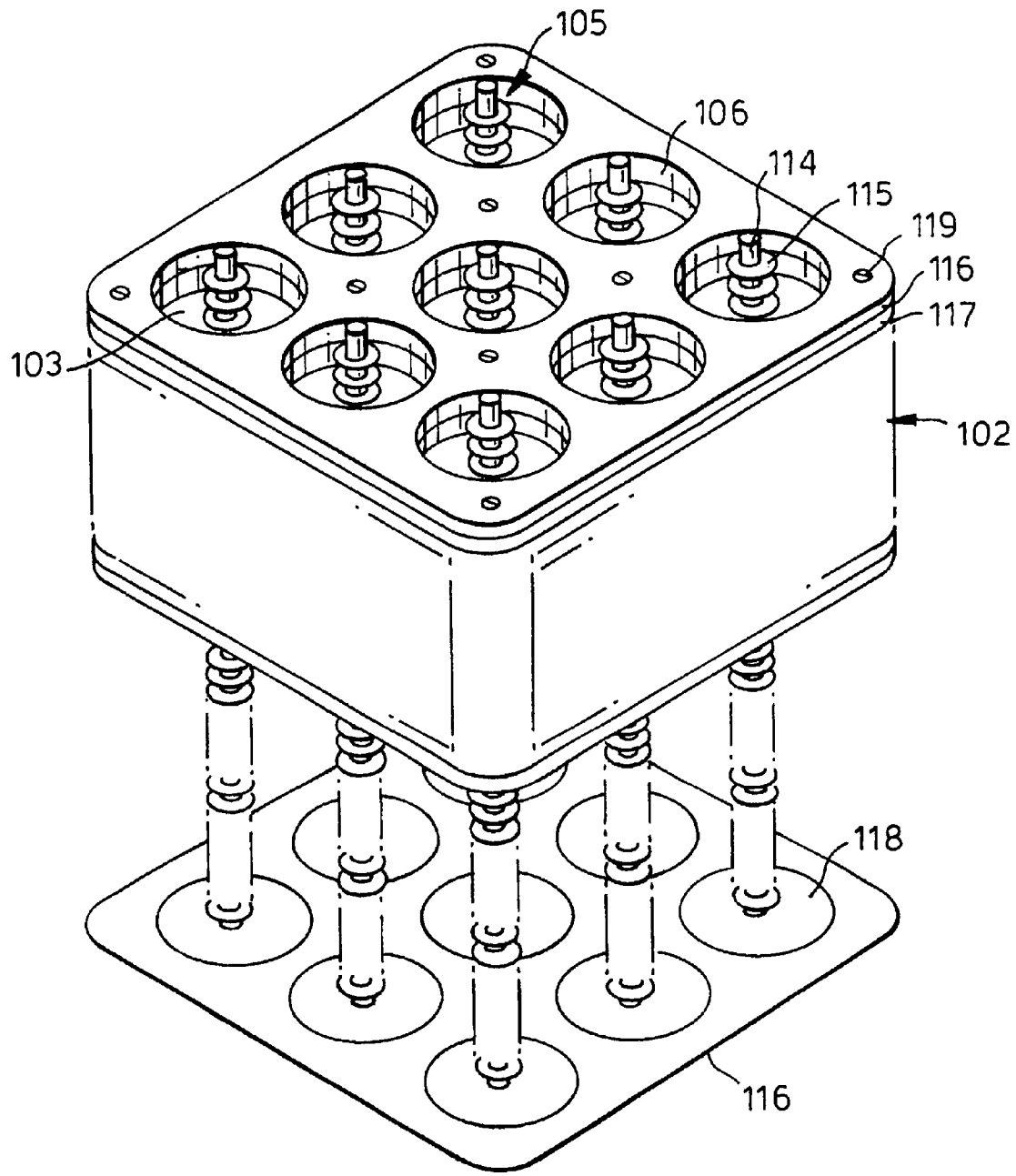
FIG. 4 is a schematic projection of the electrode structure of another version of the embodiment of the invention shown in FIG. 1.

Other configurations can be adopted, and FIG. 4 shows, schematically, the electrodes of one such, in which nine reactor chambers 106 are disposed in a square array, but the simplicity of connection and impedance matching is lost.

If it is desired to operate the apparatus with corona discharges of the so-called silent type, then each of the passages 103 in the outer electrode 102 can have a liner made of an insulating, preferably heat-resistant material inserted into it.

Figure 5:
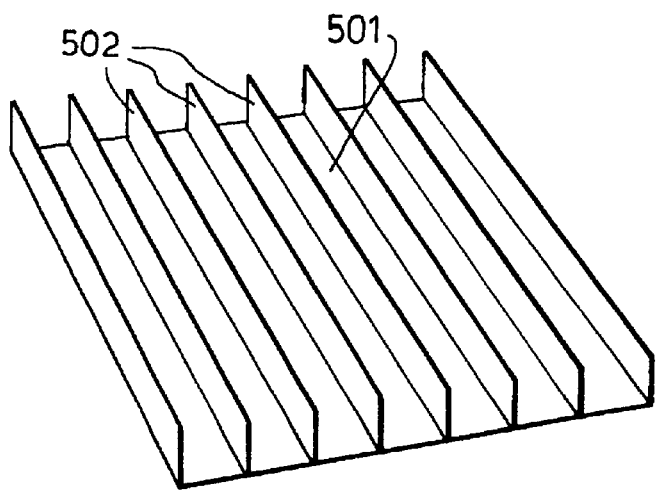
FIG. 5 is a diagrammatic perspective view illustrating a stage in a method of manufacturing components for a second embodiment of the invention.
Figure 6:
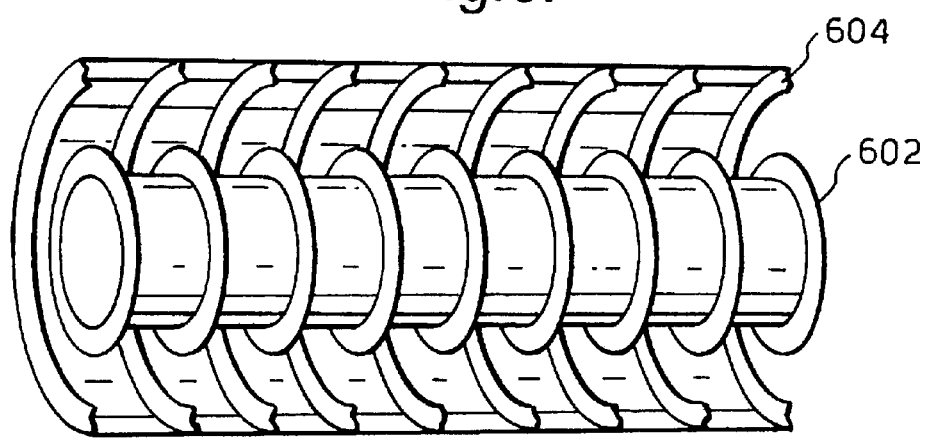
FIG. 6 is a diagrammatic perspective view, partly cut away, of electrodes made from the component shown in FIG. 5.

FIGS. 5 and 6 illustrate a method of manufacturing both inner and outer electrodes which is simpler than those described above.

Referring to FIG. 5, a flat sheet 501 with upstanding webs 502 is formed by welding L or T section stainless steel strips together, either edge to edge, or, more straightforwardly, onto a separate flat sheet, so that the webs extend parallel to one another and are appropriately spaced apart. The sheet 501 is then rolled into a cylinder with the webs 502 extending radially and transversely to the longitudinal axis of the cylinder, and the butting edges seam welded together.

For the inner electrode 602 (see FIG. 6) the webs are arranged to be on the outer surface of the tube and for the outer electrode 604 (shown cut away in FIG. 6) the webs are arranged to be on the inner surface of the tube. In order to achieve the required opposition of the projections when the tubes forming the inner and outer electrodes 602 and 604, respectively, are assembled, the spacing of the webs on the sheet which is destined to become the inner electrode 602 is the same as that between the webs on the outer electrode 504.

To construct a reactor as a whole, an appropriate number of individual electrode assemblies 602; 604 are mounted in a casing which has a common inlet for a gaseous medium to be processed in the reactor and a common outlet for processed gaseous medium. As before, a common power supply can be used and the electrical parameters of each of the individual electrode assemblies 602; 604 are matched so that they can operate simultaneously and at the same power level.

In the embodiments described so far, a common power supply has been used. In many cases, this is satisfactory. However, for larger reactors, say those greater than 500 mm in diameter, the length of the connections from the common power supply to the individual reactor chambers can cause an unacceptable voltage drop. In circumstances where this is likely to be the case, each of the individual reactor chambers can be provided with its own high voltage power supply which is connected directly to the inner electrode of that individual reactor.

For this arrangement to be practicable, either the power supply units must be capable of operating at whatever might be the temperature of the gaseous medium to be processed, or some means of cooling the power supply units must be provided. Also, it is believed to be desirable to provide some means for ensuring that the power supplies operate in unison.

Figure 7:
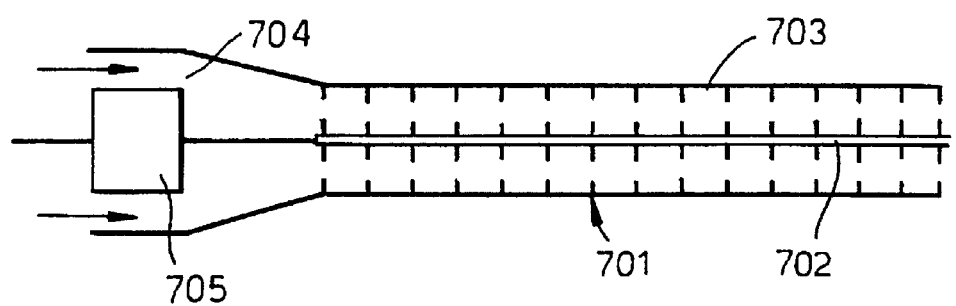
FIG. 7 shows a particular arrangement of a power supply used in connection with an embodiment of the present invention.

FIG. 7 shows schematically one such arrangement. Referring to FIG. 7, an individual reactor chamber 701 has an inner electrode 702 and an outer electrode 703, which can either be of the form described with reference to FIGS. 1 to 4, that is to say, formed by a cylindrical passage in a body of material, or a tube as in the case of the embodiment of the invention described with reference to FIGS. 5 and 6. Situated at the inlet end 704 of the outer electrode 703 and attached directly to the inner electrode 702 is a high voltage power supply 705 capable of generating voltages greater than 100 KV. The power supply 705, together with similar power supplies associated with the other individual reactor chambers 701 is fed from a common, pulsed, low voltage power supply, which is not shown in the Figure. Thus the high voltage power supplies 705 operate in unison, as do the individual reactor chambers.

Another advantage of the use of separate power supplies for the individual reactor chambers is that the number of individual reactor chambers in use can be varied if so desired. Also, the failure of one high voltage power supply would not affect the operation of the other individual reactor chambers.

Thus, particularly if a measure of redundancy is built into the apparatus, the likely downtime of the reactor as a whole can be reduced compared with that of a system which has a single high voltage power supply.

The invention is not restricted to the details of the foregoing examples. For instance, it is possible to arrange for the discharge pulse to be applied to each individual reactor in a timed sequence, rather than simultaneously. This may be achieved, in the configuration of FIGS. 1 to 4, using a single power supply with an appropriate distributor (similar in principle to that of an ignition system for an internal combustion engine). For the configuration of FIG. 7, appropriate sequenced firing would be achieved by controlling each separate power supply 705. Simultaneity of discharge through an assembly of a plurality of reactors is, however, believed to be preferable. Whilst it is desirable for the electrode assembly to be fabricated from a high temperature corrosion resistant metal, it will be appreciated that the material may be selected to suit best, and most economically, the particular gas treatment application for which the reactor is destined.

Whilst FIG. 7 illustrates a configuration with the power supply 705 mounted at the gas inlet end, it is possible to mount the power supply at the outlet end.

What is claimed is:

1. A corona discharge reactor for use in the processing of gaseous media by means of an electrical discharge, including a plurality of individual cylindrical reactor chambers each of which has a central electrode having radial projections thereon, and a concentric outer electrode, a conduit for admitting a gaseous medium to the reactor chambers to be processed in parallel thereby, an outlet for processed gaseous medium from the reactor chambers, and an electrical power supply having power supply lines for applying when switched on a sequence of pulses of electrical energy across the electrodes of the reactor chambers, wherein the electrical impedances of the reactor chambers and the associated power supply lines are matched to one another so that the pulses of electrical energy are applied equally to the individual reactor chambers at predetermined intervals.

2. A corona discharge reactor according to claim 1, wherein the pulses of electrical energy are applied to the electrodes of each of the reactor chambers simultaneously.

3. A corona discharge reactor according to claim 1, wherein the outer electrodes of the individual reactor chambers are provided by an outer electrode assembly comprising a plurality of parallel gas passages in a single body of material.

4. A corona discharge reactor assembly according to claim 3, wherein the outer electrode assembly comprises a stack of metal plates separated by plates of a heat resisting insulating material, each of the said metal and insulating plates, respectively, having corresponding holes therein to form, when assembled, the said gas passages.

5. A corona discharge reactor according to claim 4, wherein the arrangement of the said stack of metal plates is such that there is one of the metal plates of the outer electrode assembly opposite each one of the radial projections on the central electrodes of the individual reactor chambers.

6. A corona discharge reactor according to claim 4, wherein the holes in the insulating plates forming the gas passages are of larger diameter than the corresponding holes in the metal plates.

7. A corona discharge reactor according to claim 6, wherein edges of the holes in the metal plates of the outer electrode assembly are tapered to form a sharp edge.

8. A corona discharge reactor according to claim 1, wherein the electrical power supply is adapted to produce pulses of electrical energy having pulse rise times less than ten nanoseconds, durations of the order of tens of nanoseconds, repetition rates in the range 100 Hz to 3 KHz and peak voltages of the order of a hundred kilovolts.

9. A corona discharge reactor according to claim 1, wherein there is a separate matched high voltage power supply attached directly to each central electrode of a reactor chamber and means for applying common trigger pulses separately to each said high voltage power supply.

10. A corona discharge reactor according to claim 1, wherein the outer electrode of each reactor chamber comprises a metal plate having a plurality of regularly spaced parallel webs thereon, rolled into a tube with the ribs projecting inwardly and seam welded to provide a gas-tight tubular electrode.

11. A corona discharge reactor according to claim 1, wherein the central electrode of each reactor chamber consists of a metal plate having a plurality of regularly spaced webs thereon, rolled into a tube with the webs projecting outwardly and seam welded to provide a gas tight tubular electrode.

12. A corona discharge reactor including a plurality of individual reactor chambers each having an inner electrode, said reactor chambers being arranged so that their inner electrodes are disposed regularly around a circle, wherein there is a single power input terminal located at the centre of the circle and the inner electrodes of the individual reactor chambers are connected to the central input terminal via conductors having matching electrical impedances.

13. A corona discharge reactor for use in the processing of gaseous media by means of an electrical discharge, including a plurality of individual cylindrical reactor chambers each of which has a central electrode having radial projections thereon, and a concentric outer electrode, a conduit for admitting a gaseous medium to be processed to the reactor chambers, an outlet for processed gaseous medium from the reactor chambers, and an electrical power supply having power supply lines for applying, when switched on, a succession of pulses of electrical energy across the electrodes of the reactor chambers, wherein the electrical impedances of the reactor chambers and the associated power supply lines are matched to one another so that the pulses of electrical energy are applied equally to the individual reactor chambers at predetermined intervals.

14. A reactor according to claim 13, wherein the pulses of electrical energy are applied to the electrodes of each of the reactor chambers simultaneously.

* * * * *